(12) United States Patent
Caveney

(10) Patent No.: US 9,380,358 B2
(45) Date of Patent: Jun. 28, 2016

(54) RFID PATCH CORD IDENTIFICATION AND SIGNALING

(71) Applicant: Jack E. Caveney, North Palm Beach, FL (US)

(72) Inventor: Jack E. Caveney, North Palm Beach, FL (US)

(73) Assignee: Panduit Corp., Tinley Park, IL (US)

( * ) Notice: Subject to any disclaimer, the term of this patent is extended or adjusted under 35 U.S.C. 154(b) by 532 days.

(21) Appl. No.: 13/624,250

(22) Filed: Sep. 21, 2012

(65) Prior Publication Data

US 2013/0076589 A1    Mar. 28, 2013

Related U.S. Application Data

(60) Provisional application No. 61/539,035, filed on Sep. 26, 2011.

(51) Int. Cl.
| | |
|---|---|
| *H01Q 1/50* | (2006.01) |
| *H04Q 1/02* | (2006.01) |
| *G02B 6/38* | (2006.01) |

(52) U.S. Cl.
CPC .............. *H04Q 1/138* (2013.01); *G02B 6/3895* (2013.01); *G02B 6/3897* (2013.01)

(58) Field of Classification Search
CPC ....................................................... H01Q 1/50
USPC ............................... 343/906; 439/491; 340/10
See application file for complete search history.

(56) References Cited

U.S. PATENT DOCUMENTS

| | | | | |
|---|---|---|---|---|
| 6,281,293 B1* | 8/2001 | Fujii | | 525/233 |
| 7,605,707 B2* | 10/2009 | German | | H01R 13/465 340/572.7 |
| 8,138,925 B2* | 3/2012 | Downie | | G06K 5/02 340/10.1 |
| 8,248,208 B2* | 8/2012 | Renfro, Jr. | | 340/10.1 |
| 8,264,366 B2* | 9/2012 | Chamarti | | G01D 21/00 340/10.42 |
| 8,643,476 B2* | 2/2014 | Pinn et al. | | 340/10.6 |
| 2006/0063406 A1* | 3/2006 | Shifris | | H04L 41/12 439/119 |
| 2008/0122579 A1* | 5/2008 | German et al. | | 340/10.1 |
| 2009/0108995 A1* | 4/2009 | Tucker | | G06K 7/0008 340/10.1 |
| 2009/0166404 A1* | 7/2009 | German | | H04Q 1/138 235/375 |
| 2009/0249444 A1* | 10/2009 | Macauley | | H04Q 1/138 726/3 |
| 2009/0261955 A1* | 10/2009 | Moore | | H04Q 9/00 340/10.42 |
| 2010/0098425 A1* | 4/2010 | Kewitsch | | G02B 6/3895 398/116 |
| 2010/0109892 A1* | 5/2010 | Fariello et al. | | 340/653 |
| 2010/0210135 A1 | 8/2010 | German et al. | | |
| 2011/0140856 A1* | 6/2011 | Downie | | G06K 19/0707 340/10.1 |
| 2011/0227705 A1* | 9/2011 | Khozyainov | | G01S 13/74 340/10.1 |
| 2013/0078848 A1* | 3/2013 | Kummetz | | H04Q 1/138 439/488 |
| 2014/0141649 A1* | 5/2014 | Standish | | G06K 7/10415 439/620.01 |

FOREIGN PATENT DOCUMENTS

| | | |
|---|---|---|
| WO | 2006063023 A1 | 6/2006 |
| WO | 2009091888 A1 | 7/2009 |

* cited by examiner

*Primary Examiner* — Huedung Mancuso
(74) *Attorney, Agent, or Firm* — Christopher S. Clancy; James H. Williams; Yuri Astvatsaturov

(57) ABSTRACT

In some embodiments, systems and methods according to the presentation use RFID signaling to detect patch cord connections in a patch panel, and also to provide visible indicators to technicians making moves, adds, or changes to patch cord connections. In one embodiment, the present invention includes a series of RFID antennae combined into an antenna array and mounted on an add-on adapter, which in turn may be mounted on corresponding telecommunication equipment.

18 Claims, 6 Drawing Sheets

 ...

RFID PATCH CORD IDENTIFICATION AND SIGNALING

CROSS-REFERENCE TO RELATED APPLICATIONS

This application claims the benefit of U.S. Provisional Patent Application No. 61/539,035, filed on Sep. 26, 2011.

This application incorporates by reference in its entirety U.S. patent application Ser. No. 12/616,424, entitled "Intelligent Patching System" and published as Pub. No. 2010/0120264 on May 13, 2010.

BACKGROUND

As telecommunication equipment evolves, cabling systems continue to expand requiring users to manage large numbers of cables and their respective connection and termination points. Enterprises, such as data centers and office building, often have hundreds or thousands of cables connecting various pieces of network equipment by way of direct connections and/or patch panels. In such environments, the ability to manage cable connectivity, especially within patch panels, can be instrumental in being able to quickly execute installation, maintenance, and/or repair work orders, and provide general connectivity information which may be useful to users like data center managers.

Therefore there exists a need for devices, systems, and methods which may assist users in tracking and/or managing cable interconnections.

SUMMARY

Accordingly, the present invention is directed to apparatuses, systems, and methods associated with assisting users in tracking and/or managing cable interconnections.

In one embodiment, the present invention is an add-on adapter for attachment to telecommunication equipment, the add-on adapter including: a securing portion, the securing portion used to attach the add-on adapter to the telecommunication equipment; a mounting portion; and at least one RFID antenna mounted to said mounting portion.

In another embodiment, the present invention is a system for managing cable connections, the system comprising: telecommunication equipment having a plurality of equipment connectors; an add-on adapter secured to the telecommunication equipment, the add-on adapter including a mounting portion and at least one RFID antenna mounted to the mounting portion; and at least one cable connector adapted to be received by at least one of the plurality of equipment connectors, the at least one cable connector including an RFID tag which enables identification of the at least one cable connector.

These and other features, aspects, and advantages of the present invention will become better understood with reference to the following drawings, description, and any claims that may follow.

DETAILED DESCRIPTION

In some embodiment, systems and methods according to the presentation use RFID signaling to detect patch cord connections in a patch panel, and to also provide visible indicators to technicians making moves, adds, or changes to patch cord connections.

Figure 1:
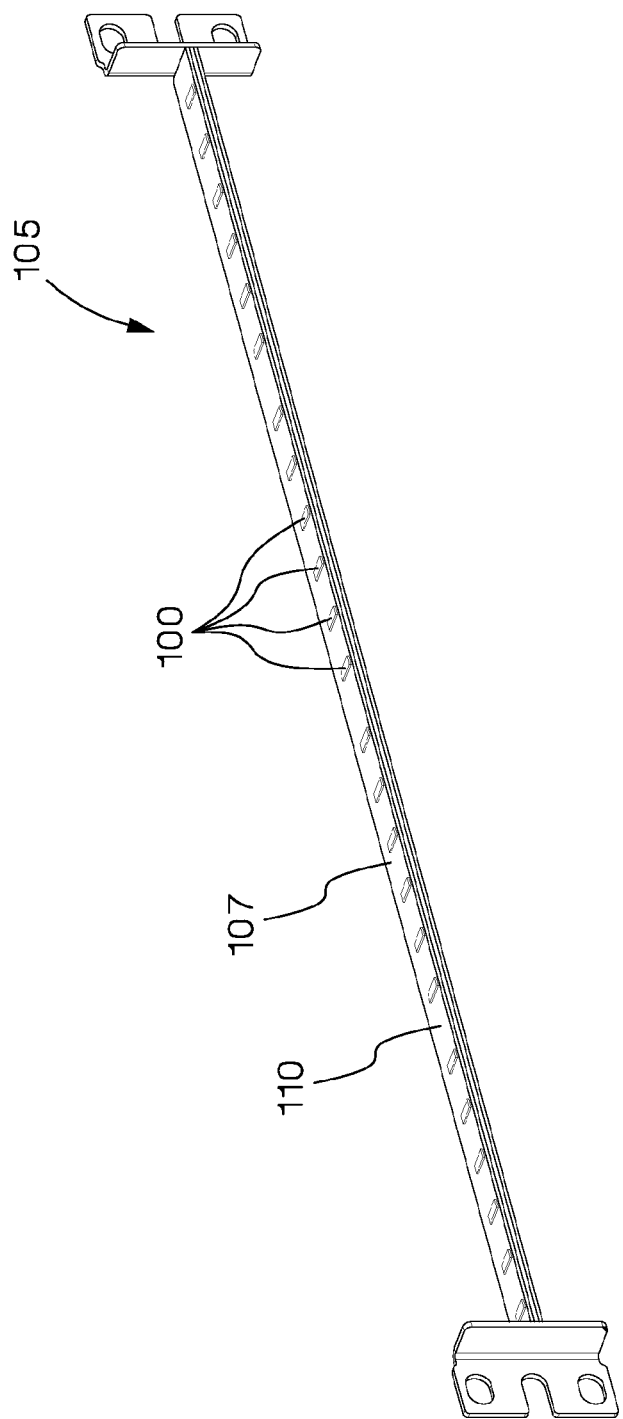
FIG. 1 shows a perspective view of an add-on bar with an antenna array according to one embodiment of the present invention for attachment to a patch panel.
Figure 2:
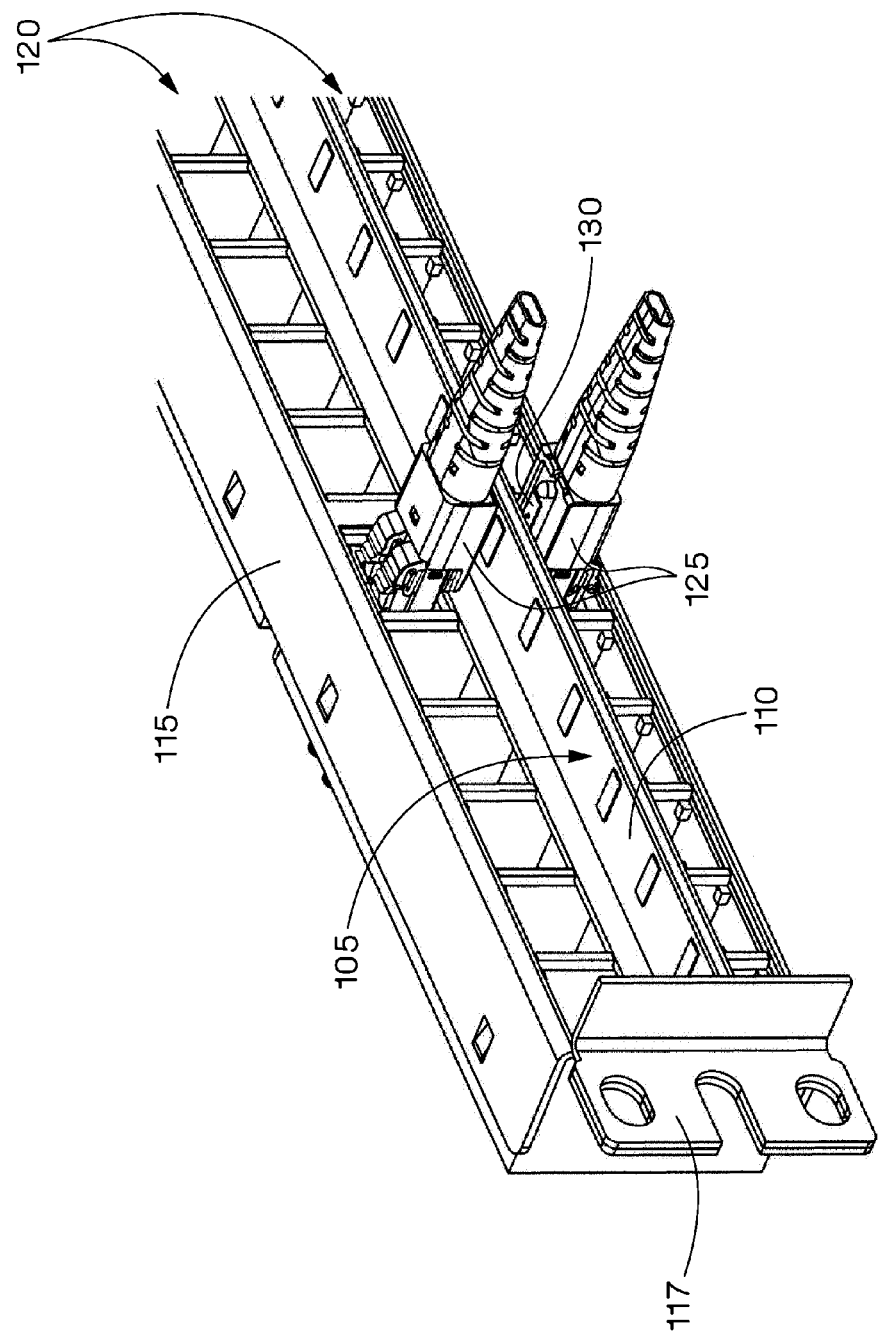
FIG. 2 shows a perspective view of a fiber optic patch panel with an RFID (radio frequency identification) antenna array according to one embodiment of the present invention.

FIG. 1 shows one embodiment of the present invention which includes a series of RFID antennae 100 combined into an antenna array 105 and mounted on a mounting portion 107 of an add-on adapter such as the add-on bar 110. The add-on bar 110, together with the antenna array 105, can be attached to the front of a modular patch panel 115, via a securing portion 117, as shown in FIG. 2. In the shown embodiment, the modular patch panel has inverted rows of connectors 120. Thus, when RFID enabled connectors (such as the RFID enabled duplex LC connectors 125 with an RFID tags) are installed into the patch panel, RFID antennae 130 on the connectors face the centrally-disposed RFID antenna array 105. While the embodiments of the present invention are illustrated in use on a 48-port, single-rack-unit fiber optic patch panel, use on other types of patch panels or networking hardware (including use with switches and with hardware using copper connectors) is also contemplated.

Figure 3:
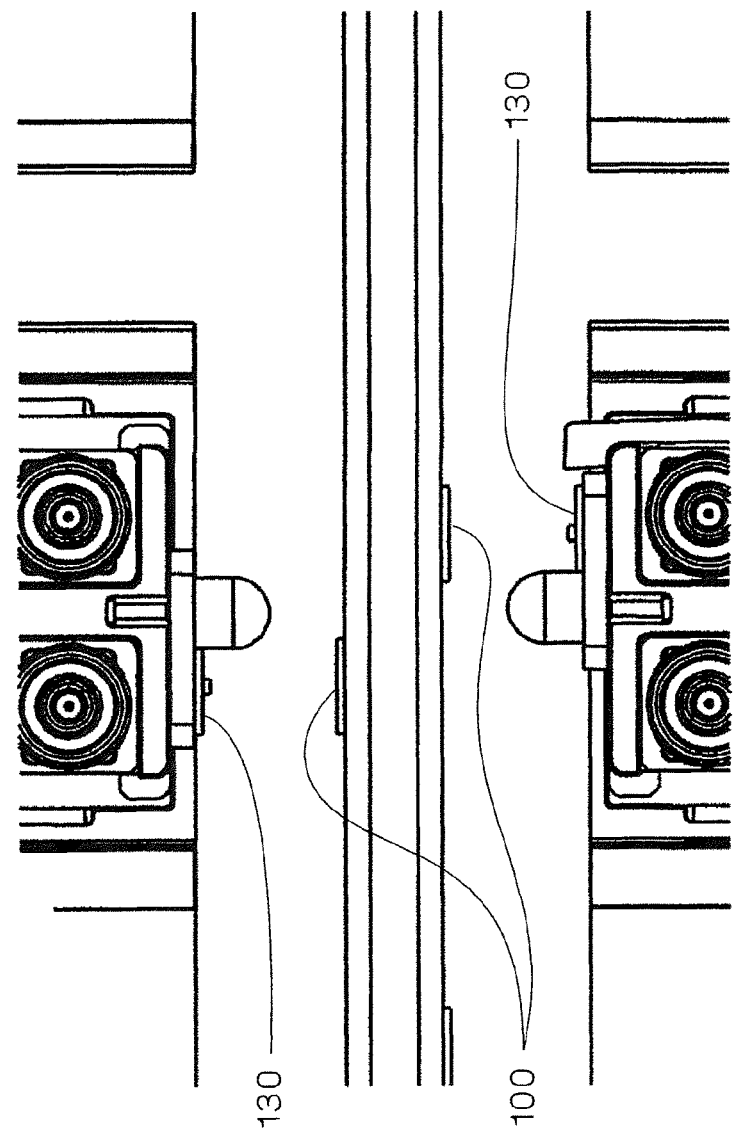
FIG. 3 shows a front view of fiber optic connectors plugged into patch panel ports according to one embodiment of the present invention.

The near field antennae 100 of the antenna array 105 are staggered top and bottom for the inverted rows of connectors. As shown in FIG. 3, the staggered configuration allows for better alignment between the RFID antennae 100 of the antenna array 105 and the RFID antennae 130 of the connectors 125.

Figure 4:
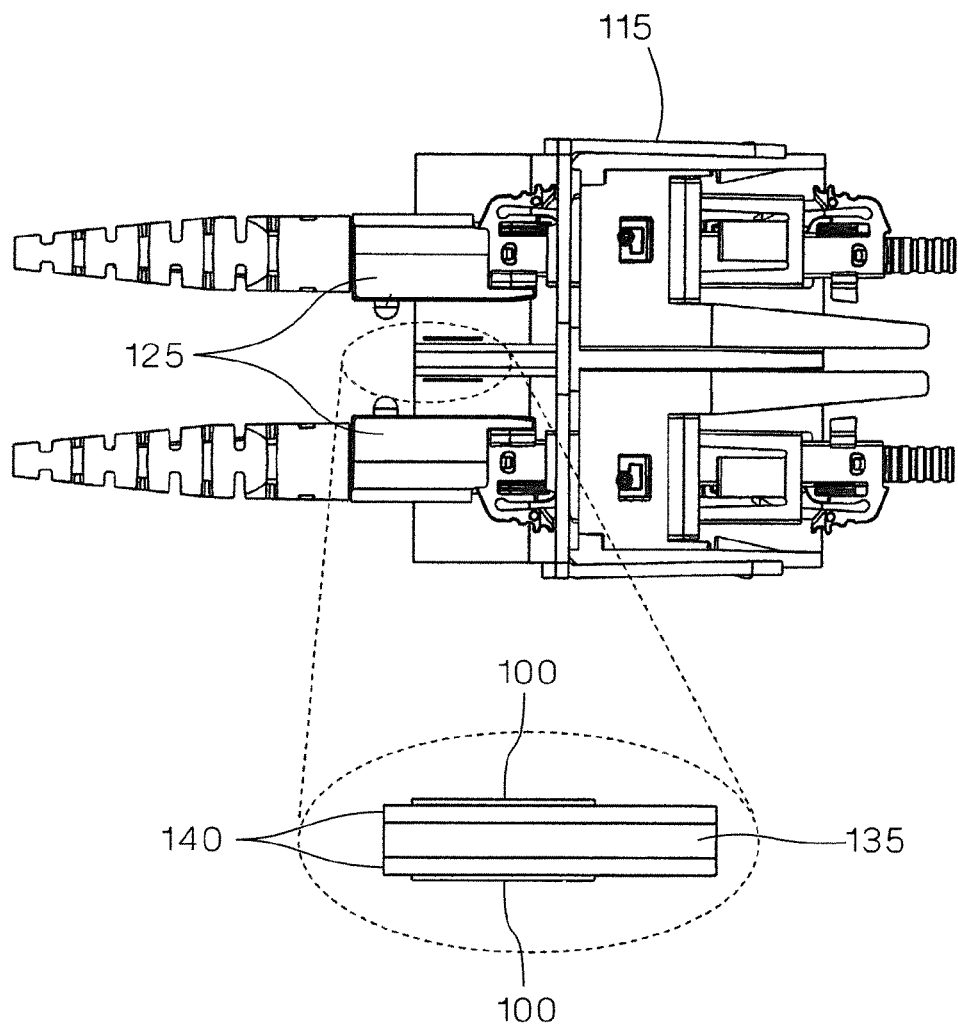
FIG. 4 shows a side view and a detail view of fiber optic connectors plugged into patch panel ports according to one embodiment of the present invention.

In one embodiment, shown in FIG. 4, the antenna array 105 includes a bar 135 comprising a ferrite material with rigid PCBs 140 mounted to either side of the bar and antennae 100 mounted to the exterior region of the PCBs 140. Note that the patch panel to cabinet/RFID system connection is not shown.

Figure 5:
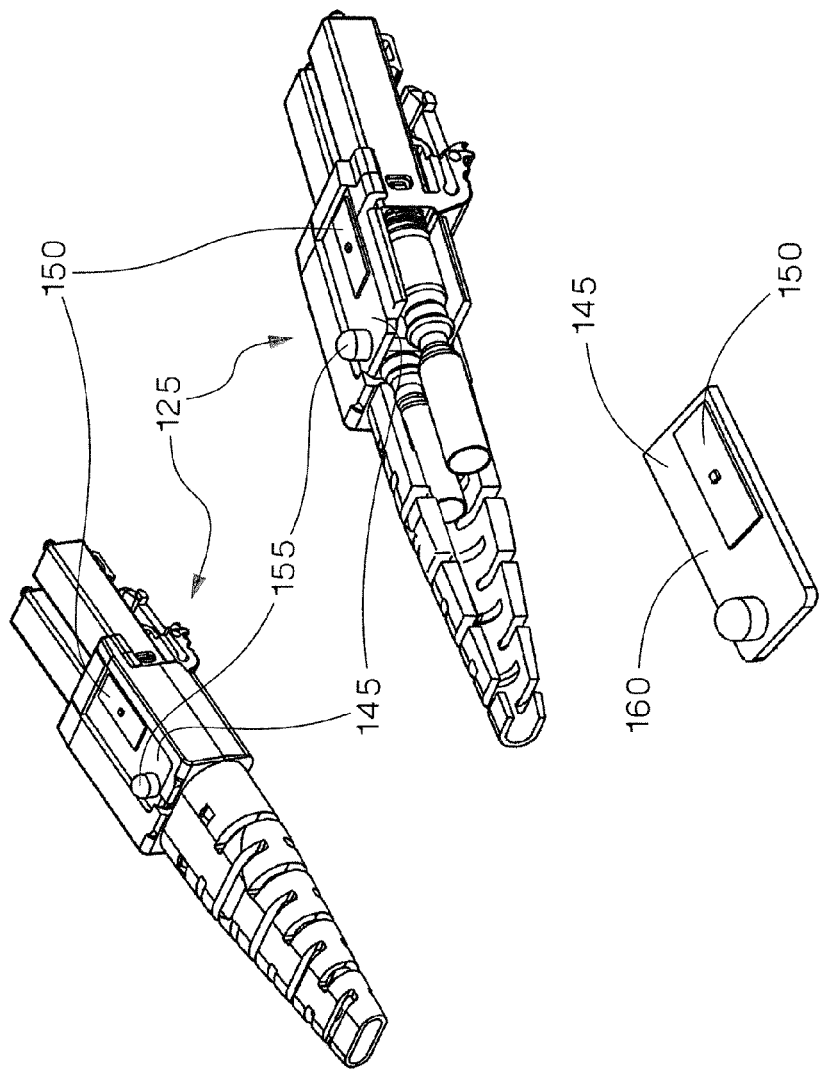
FIG. 5 show a perspective view and a partial cutaway view of a fiber optic connector with RFID components according to one embodiment of the present invention.
Figure 6:
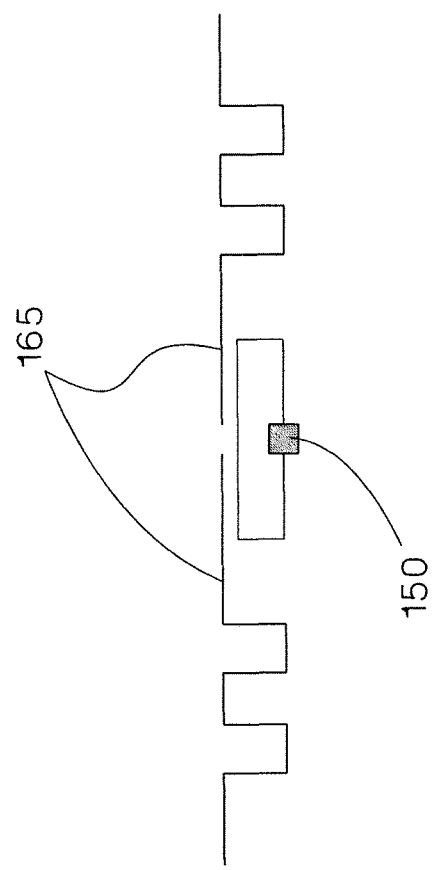
FIG. 6 is a detail view of antennae on a PCB (printed circuit board) according to one embodiment of the present invention.

The connectors 125 also have a PCB assembly 145 mounted within their housing, as shown in FIG. 5. In the presently described embodiment, the PCB 145 comprises an RFID tag 150 (substrate, chip, and near field antenna 130), an LED 155, a far field dipole antenna 160 coupled with the near field antenna/chip of RFID tag 150 (to harvest RF signal for the LED activation), and any other required circuitry.

In one embodiment, an RFID reader sends two alternate pulses. The first pulse determines the RFID identification information for the connector. The second alternate pulse stores a charge in a capacitor which sends a pulse of energy to the LED when the capacitor is fully charged.

When the connector 125 is installed into a patch panel 115, or other applicable equipment, the RFID tag 150 will be in close (parallel) proximity to its respective antenna on the add-on bar 110. At this point, an RFID reader can interrogate the tag and determine if it is in its proper port. An LED on the front of the patch panel will be activated to indicate proper connection. Further description of the various embodiments of patch panels with LEDs can be found in U.S. Patent Application Publication No. 2010/0120264.

In one embodiment, the far field dipole antenna mounted on the add-on bar 110 may also be utilized in a "hand scanning" operation, in which a group of patch cords are scanned with an RFID reader to determine the proper cord for a connection. Once a proper connector is identified, the LED 155 provided on the connector of the patch cord will pulse to indicate the proper cord.

In another embodiment, the far field dipole antenna 165 mounted on the add-on bar 110 may be modified by increasing the surface area thereof, such that the far dipole antenna at least partially surrounds the RFID tag 150 of the connector when the connector is installed in the corresponding equipment. Such a modified configuration may help increase the antenna's spatial radiation pattern (i.e., broadening the pattern, and also shortening its overall length and width).

In yet another embodiment, the connector PCB assembly 145 described herein may be designed as a retro-fittable "pcb/label" that can be attached to existing patch cords or connectors.

Note that while this invention has been described in terms of one or more embodiment(s), these embodiment(s) are non-limiting, and there are alterations, permutations, and equivalents, which fall within the scope of this invention. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

I claim:

1. An add-on adapter for attachment to telecommunication equipment, said add-on adapter comprising:
   a securing portion, said securing portion used to attach said add-on adapter to said telecommunication equipment;
   a mounting portion; and
   at least one RFID antenna mounted to said mounting portion,
   wherein said mounting portion includes a first side and a second side, said at least one RFID antenna mounted to said first side and at least another RFID antenna mounted to said second side.

2. The add-on adapter of claim 1, wherein said at least one RFID antenna substantially aligns with at least one equipment connector on said telecommunication equipment.

3. The add-on adapter of claim 1, wherein said mounting portion comprises a ferrite material.

4. The add-on adapter of claim 1, wherein said mounting portion includes at least one printed circuit board, said at least one RFID antenna being mounted to said at least one printed circuit board.

5. The add-on adapter of claim 1, wherein said at least one RFID antenna and said at least another RFID antenna are staggered.

6. The add-on adapter of claim 1, wherein said at least one RFID antenna comprises a far field dipole antenna.

7. A system for managing cable connections, said system comprising:
   telecommunication equipment having a plurality of equipment connectors;
   an add-on adapter secured to said telecommunication equipment, said add-on adapter including a mounting portion and at least one RFID antenna mounted to said mounting portion; and
   at least one cable connector adapted to be received by at least one of said plurality of equipment connectors, said at least one cable connector including an RFID tag which enables identification of said at least one cable connector,
   wherein said mounting portion includes a first side and a second side, said at least one RFID antenna mounted to said first side and at least another RFID antenna mounted to said second side.

8. The system of claim 7, wherein said at least one RFID antenna substantially aligns with at least one of said plurality of equipment connectors.

9. The system of claim 7, wherein said mounting portion comprises a ferrite material.

10. The system of claim 7, wherein said mounting portion includes at least one printed circuit board, said at least one RFID antenna being mounted to said at least one printed circuit board.

11. The system of claim 7, wherein said at least one RFID antenna and said at least another RFID antenna are staggered.

12. The system of claim 7, wherein said at least one RFID antenna comprises a far field dipole antenna.

13. The system of claim 7, wherein said RFID tag includes an RFID tag antenna, a printed circuit board with a far field dipole antenna, and an electrically activated visual indicator.

14. The system of claim 13, wherein said electrically activated visual indicator is a light emitting diode.

15. The system of claim 13, wherein said RFID tag antenna capacitively couples to said far field dipole antenna.

16. The system of claim 15, wherein said at least one RFID antenna emits a first alternate pulse to identify said at least one cable connector, and a second alternate pulse to power and activate said electrically activated visual indicator.

17. The system of claim 7, wherein said telecommunication equipment is a patch panel comprising two inverted rows of said plurality of equipment connectors.

18. The system of claim 17, wherein at least one of said plurality of equipment connectors includes a patch panel electrically activated visual indicator.

* * * * *